United States Patent [19]

Becker

[11] Patent Number: 4,725,177

[45] Date of Patent: Feb. 16, 1988

[54] RETAINER FOR PREASSEMBLY OF MECHANICAL COMPONENTS

[75] Inventor: Philip D. Becker, Southbury, Conn.

[73] Assignee: Buell Industries, Inc., Waterbury, Conn.

[21] Appl. No.: 940,945

[22] Filed: Dec. 12, 1986

[51] Int. Cl.[4] .................... F16B 21/18; B23P 19/04
[52] U.S. Cl. ..................... 411/525; 411/97; 29/213 E
[58] Field of Search .............. 411/90, 92, 96, 97, 411/523–529, 966; 123/90.1; 29/213 R, 213 E

[56] References Cited

U.S. PATENT DOCUMENTS

| | | | |
|---|---|---|---|
| 679,137 | 7/1901 | Baxter | 411/97 |
| 1,066,315 | 7/1913 | Pietrzak | 411/97 |
| 1,882,306 | 10/1932 | Tinnerman | 411/526 |
| 2,421,278 | 5/1947 | Luce | 411/84 |
| 2,674,150 | 4/1954 | Flora | 411/525 |

Primary Examiner—Neill Wilson
Attorney, Agent, or Firm—St. Onge Steward Johnston & Reens

[57] ABSTRACT

A retainer is provided for holding at least two valve rocker trunnions in predetermined, fixed relationship prior to and during installation in a diesel engine assembly. The retainer is an elongated strip arcuate in cross-section and provided with shoulders. At least two cut-out sections provided with pairs of opposing spring members are adapted to receive the trunnions in an interference fit and hold them in fixed relationship while the retainer and trunnions are installed in the engine. Means are provided for holding the retainer in position on the engine assembly during installation.

5 Claims, 4 Drawing Figures

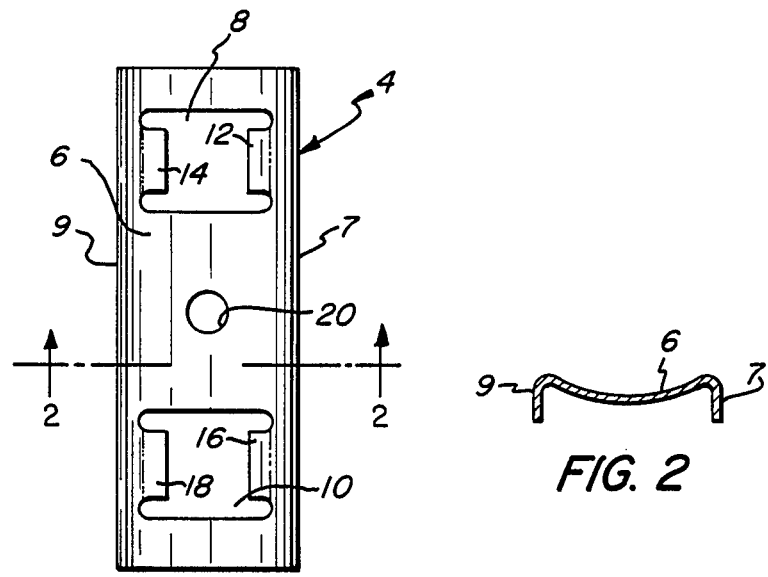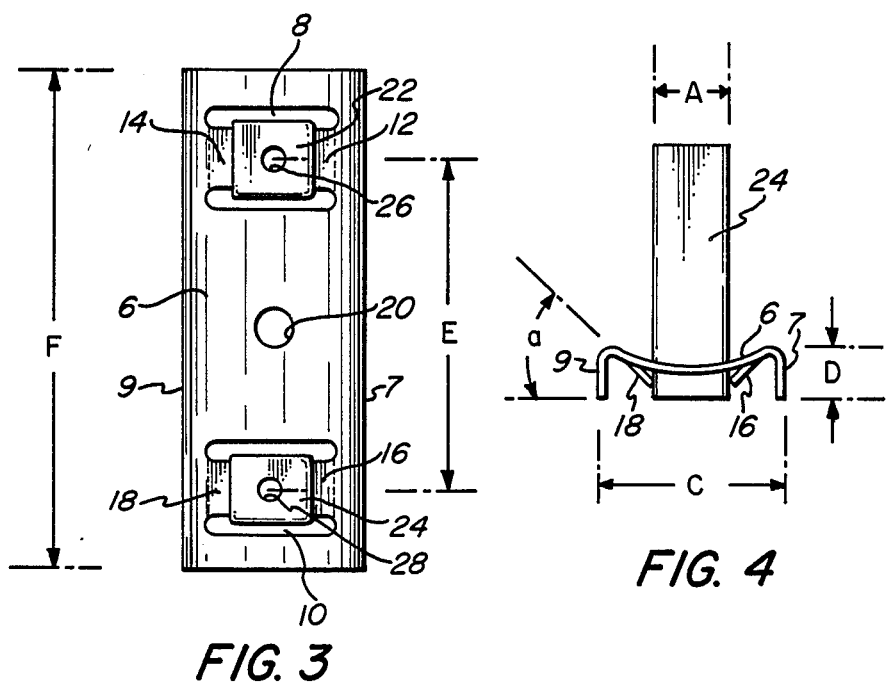

RETAINER FOR PREASSEMBLY OF MECHANICAL COMPONENTS

BACKGROUND OF THE INVENTION

1. Field of the Invention

This invention relates to a retainer for preassembling components destined to be assembled later in a complex mechanism.

2. Description of the Prior Art

In the assembly of complex mechanisms such as automobile engines and the like, it is common practice to preassemble various components prior to introducing them into the main assembly. In many instances it is necessary to ensure that the components in the preassembly are held in a predetermined fixed relationship one to another and that this relationship is maintained as the preassembly is introduced into the engine or other main assembly.

This invention is directed to an improved retainer for use in such preassembly of mechanical components.

SUMMARY OF THE INVENTION

The invention comprises a retainer for holding at least two components in predetermined, fixed relationship one to another preparatory to installation of said components in a complex assembly, the retainer comprising an elongated strip provided with shoulders along each of the longer sides thereof and having an arcuate-shaped lateral cross-section. At least two cut-out sections are disposed in predetermined relationship in the elongated strip and are each provided with a pair of opposed spring members adapted to receive, and hold therebetween in predetermined fixed relationship, at least two components to be installed in a complex assembly. The retainer is also provided with means for engaging the jig employed in forming the complex assembly.

BRIEF DESCRIPTION OF THE DRAWINGS

FIG. 1 is a plan view of a retainer in accordance with the invention.

FIG. 2 is a cross-sectional view taken along the line 2—2 in FIG. 1.

FIG. 3 is a plan view of the retainer shown in FIG. 1 with two components assembled therein.

FIG. 4 is a side elevational view of the embodiment shown in FIG. 3.

DETAILED DESCRIPTION OF THE INVENTION

The invention will be illustrated by reference to the drawings which show a particular embodiment for use in assembling the rocker trunnions which form part of a rocker arm assembly of a diesel engine and which have to be preassembled and held securely in predetermined position during assembly in the engine.

Referring to FIGS. 1 and 2, the retainer, shown generally as 4, comprises an elongated strip 6 of steel of arcuate cross-section having reinforcing shoulders 7 and 9. Cut-out sections 8 and 10 are provided with oppositely disposed spring members shown as 12 and 14 in cut-out section 8 and as 16 and 18 in cut-out section 10. The dotted lines shown associated with each spring member represent the axes about which the said members are adapted to bend or hinge when components are inserted into the cut-out sections with which the spring members are associated. Aperture 20 in the approximate center of strip 6 serves to engage an appropriately located pin in the jig (not shown) employed in the assembly of the diesel engine and thereby hold the retainer and components held therein in the requisite position for permanent installation in the engine.

FIG. 3 is a plan view of the embodiment shown in FIG. 1 after insertion of two rocker trunnions 22 and 24 in interference fit with spring members 12 and 14 in the case of trunnion 22 and spring members 16 and 18 in the case of trunnion 24. Trunnions 22 and 24 are provided with central passageways 26 and 28, respectively, through which retaining bolts (not shown) can be inserted to anchor the trunnions in the final assembly of the mechanism into which they are to be introduced. As shown in the side elevation view in FIG. 4, the insertion of trunnion 24 in the retainer 4 has caused spring members 16 and 18 to be deflected downwards so that they lie in a plane which describes an angle "a" with respect to the plane in which lie the lower edges of shoulders 7 and 9. In order to secure the trunnion 24 firmly in place in predetermined position and relationship with respect to companion trunnion 22 (not shown in FIG. 4) and hold both trunnions in place not only in the preassembly itself but also during the final installation by bolting or other means in the diesel engine assembly, it is preferred that the angle "a" be of the order of 25 degree. However, the size of the angle is not critical and larger or smaller angles can be employed without departing from the scope of the invention. As will be apparent to one skilled in the art the particular angle "a" formed in any given instance is a function of the width A of the rectangular cross-section of trunnion 24 and the distance between the outer edges of spring members 16 and 18.

In a particular embodiment of the retainer illustrated in FIG. 3 it has been found that highly satisfactory results are achieved, in terms of gripping trunnions 22 and 24 in accurately parallel relationship and retaining them in position despite handling and twisting forces exerted during bolting down in the final assembly, if the following relative dimensions of components are present. The cross-sectional width C of retainer 4 is preferably twice the cross-sectional width A of trunnions 22 and 24 and the depth D of shoulders 7 and 9 is preferably 0.4 times the cross-sectional width A. The dimensions E and F, which are respectively the distance between the centers of cut-outs 8 and 10 and the total length of retainer 4, are less important and governed by different considerations. However, the relationship between the two is preferably such that dimension F is at least equal to the sum of E plus 2B.

The retainer 4 is preferably fabricated by stamping out from spring steel with subsequent heating using conventional procedures to temper the metal. Advantageously, the thickness of spring steel employed is of the order of 0.05 A but the optimum thickness of steel and the optimum relative dimensions A, B, C, D, E, and F in any given instance can be determined readily by a process of trial and error.

The embodiments described above have been given for purposes of illustration only and are not to be construed as limiting the scope of the invention. Various modifications which can be made without departing from the scope of the present invention will be readily apparent to one skilled in the art.

What is claimed is:

1. A retainer for holding at least two valve rocker assembly trunnions in predetermined, fixed relationship preparatory to and during installation of said trunnions in a diesel engine assembly, said retainer comprising in combination:

an elongated strip provided with shoulders along each of the longer sides thereof and having a concave arcuate shaped lateral cross-section;

said strip having at least two cut-out sections disposed in predetermined relationship to each other;

said cut-out sections being each provided with a pair of opposing spring members adapted to receive and hold said trunnions therebetween in predetermined, fixed relationship; and means located on said strip for interlockingly engaging said diesel engine assembly and holding said retainer in the correct configuration for installation of said trunnions in said assembly.

2. A retainer in accordance with claim 1 integrally formed from spring steel and subsequently heat treated.

3. A retainer in accordance with claim 1 wherein said spring members each form two opposing sides of a rectangle shaped to receive said trunnions in an interference fit.

4. A retainer in accordance with claim 1 wherein the cross-sectional width of the retainer is approximately twice the cross-sectional width of the components to be inserted in the cut-out sections thereof and the depth of said shoulders is approximately 0.4 times the cross-sectional width of said components.

5. A retainer in accordance with claim 3 wherein said spring members, after insertion of said trunnions in interference fit, lie in a plane describing an angle of approximately 25 degrees with respect to the plane in which the lower edges of the shoulders of said retainer are disposed.

* * * * *